(12) United States Patent  (10) Patent No.: US 7,830,439 B2
Kishi (45) Date of Patent: Nov. 9, 2010

(54) IMAGE SENSING ELEMENT AND PROCESSING APPARATUS

(75) Inventor: Takafumi Kishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 637 days.

(21) Appl. No.: 11/353,721

(22) Filed: Feb. 13, 2006

(65) Prior Publication Data

US 2006/0181628 A1     Aug. 17, 2006

(30) Foreign Application Priority Data

Feb. 15, 2005     (JP)     ............... 2005-038321

(51) Int. Cl.
 *H04N 5/335*     (2006.01)
(52) U.S. Cl. .............. 348/308; 348/302; 348/314
(58) Field of Classification Search ........ 348/296, 348/302–310, 314
See application file for complete search history.

(56) References Cited

U.S. PATENT DOCUMENTS

| | | | | |
|---|---|---|---|---|
| 4,967,249 A | * | 10/1990 | Suni | 257/220 |
| 5,144,399 A | * | 9/1992 | Nakayama et al. | 348/625 |
| 6,018,365 A | * | 1/2000 | Merrill | 348/302 |
| 6,307,195 B1 | * | 10/2001 | Guidash | 250/208.1 |
| 6,710,804 B1 | * | 3/2004 | Guidash | 348/302 |
| 6,850,278 B1 | * | 2/2005 | Sakurai et al. | 348/302 |
| 2002/0096621 A1 | * | 7/2002 | Yoneda et al. | 250/208.1 |
| 2004/0239791 A1 | | 12/2004 | Mabuchi | |

FOREIGN PATENT DOCUMENTS

| | | |
|---|---|---|
| JP | 08-223490 A | 8/1996 |
| JP | 11-313257 | 11/1999 |
| JP | 2000-59688 | 2/2000 |
| JP | 2000-287131 | 10/2000 |
| JP | 2001-177775 | 6/2001 |
| JP | 2002-158928 A | 5/2002 |
| JP | 2003-018471 A | 1/2003 |
| JP | 2003-87665 | 3/2003 |

* cited by examiner

*Primary Examiner*—Sinh Tran
*Assistant Examiner*—Mark Monk
(74) *Attorney, Agent, or Firm*—Canon U.S.A., Inc., IP Division

(57) ABSTRACT

There is disclosed an image sensing apparatus including at least one pixel, a signal read unit, and a saturation detector. The pixel includes a photoelectric converter, a semiconductor region, and a transfer controller which transfers a charge generated in the photoelectric converter to the semiconductor region. The signal read unit is configured to output a signal from the semiconductor region. The saturation detector includes a reset controller which detects a signal generated in the semiconductor region during an exposure period of the photoelectric converter, and resets the photoelectric converter based on the detection result.

4 Claims, 11 Drawing Sheets

IMAGE SENSING ELEMENT AND PROCESSING APPARATUS

This application claims the benefit of Japanese Patent Application No. 2005-038321 filed on Feb. 15, 2005, which is hereby incorporated by reference herein in its entirety.

FIELD OF THE INVENTION

The present invention relates to an image sensing element and a processing apparatus which comprises it.

BACKGROUND OF THE INVENTION

Conventionally, as a method of broadening the dynamic range of an image sensing element, many proposals have been made. For example, Japanese Patent Laid-Open No. 11-313257 describes an arrangement which outputs a signal corresponding to a logarithm of light that enters a photodiode in a pixel unit. Japanese Patent Laid-Open No. 2000-59688 describes a method of broadening the dynamic range by performing photoelectric conversion by both a photodiode and floating diffusion. Japanese Patent Laid-Open No. 2001-177775 describes a method of broadening the dynamic range by transferring a charge generated by a photodiode to a floating diffusion a plurality of number of times.

FIG. 2 is a circuit diagram showing the arrangement of one pixel in an image sensing element, and that of a circuit for reading out a signal from that pixel. In the image sensing element, a pixel array which provides a two-dimensional image is formed by arranging a plurality of pixels in a two-dimensional array.

Each pixel 201 includes a photodiode (to be also abbreviated as PD hereinafter) 202, transfer switch 203, floating diffusion unit (to be also abbreviated as FD hereinafter) 204, reset switch 207, amplifying MOS amplifier 205, and selection switch 206.

The PD 202 serves as a photoelectric converter that photoelectrically converts light coming via an optical system. The anode of the PD 202 is connected to a ground line, and its cathode is connected to the source of the transfer switch 203. The transfer switch 203 is driven in response to a transfer pulse φTX input to its gate terminal, and transfers a charge generated by the PD 202 to the FD 204. The FD 204 serves as a charge-voltage converter which temporarily accumulates the charge, and converts the accumulated charge into a voltage signal.

The amplifying MOS amplifier 205 serves as a source follower, and its gate receives the signal that has undergone the charge-voltage conversion by the FD 204. The drain of the amplifying MOS amplifier 205 is connected to a first power supply line VDD1 that provides a first potential, and its source is connected to the selection switch 206. The selection switch 206 is driven by a vertical selection pulse φSEL, its drain is connected to the amplifying MOS amplifier 205, and its source is connected to a vertical signal line 260. When the vertical selection pulse φSEL goes to active level (high level), the selection switch 206 of a pixel which belongs to the row of interest of a pixel array is enabled, and the source of the amplifying MOS amplifier 205 is connected to the vertical signal line 260.

The drain of the reset switch 207 is connected to a second power supply line VDD2 which provides a second potential (reset potential), and its source is connected to the FD 204. The reset switch 207 is driven by a reset pulse φRES input to its gate, and resets the charge accumulated on the FD 204.

A floating diffusion amplifier is formed by a constant current source 209 which supplies a constant current to the vertical signal line 260 in addition to the FD 204 and amplifying MOS amplifier 205. In each pixel that forms the row selected by the selection switch 206, a charge transferred to the FD 204 is converted into a voltage signal by it, and is output to a corresponding signal read unit 210 via the floating diffusion amplifier.

A switch 211 is used to read out a reset potential of the FD 204 as a reset level signal, and is driven by a reset level read pulse φTN. A reset level accumulation capacitor 212 accumulates a reset level signal (a signal of a potential corresponding to the reset level of the FD 204) immediately before a pixel signal is read out.

A switch 214 is used to read out a voltage signal corresponding to the charge signal generated by the PD 202, and is driven by a signal read pulse φTS. A signal level accumulation capacitor 215 accumulates a pixel signal (a signal of a potential according to a charge transferred from the PD 202 to the FD 204) when the pixel signal is read out.

A differential amplifier 217 outputs, onto an output line 218, a difference between the level of the signal accumulated on the reset level accumulation capacitor 212 and that of the signal accumulated on the signal level accumulation capacitor 215. Switches 213 and 216 are driven by a horizontal signal selection pulse φHi, and respectively transfer the potentials on the capacitors 212 and 215 to the differential amplifier 217. On the output line 218, a value obtained by amplifying the difference between the potential corresponding to the charge transferred from the PD 202 to the FD 204 and that of the FD 204 in a reset state is output as a pixel signal.

To common output lines 217a and 217b connected to the input terminals of the differential amplifier 217, typically, switches 213 and 216 in other columns, which are driven by horizontal signal selection pulses φH1 to φH(i−1) and φH(i+1) to φHn, are also connected (n is the number of columns of a pixel array 101).

FIG. 4 shows a drive pattern of the image sensing element shown in FIG. 2. During a period t401, the pulses φRES and φTX are applied to turn on the reset switch 207 and transfer switch 203. As a result, the potentials of the PD 202 and FD 204 are reset to initial potentials, and upon completion of the reset operation, a new exposure period starts. After that, the pulse φSEL is applied to turn on the selection switch 206, thus selecting a read row. During a period t402, the pulse φTN is applied to turn on the switch 211, thus writing a value corresponding to the reset potential of the FD 204 in the reset level accumulation capacitor 212.

During a period t403, the pulses φTX and φTS are applied. In response to these pulses, the switches 203 and 214 are turned on. As a result, a charge accumulated on the PD 202 is transferred to the FD 204, and a potential corresponding to the charge transferred to the FD 204 is written in the signal level accumulation capacitor 215. When the pulse φH is applied during a period t404, the switches 213 and 216 are turned on, and the difference between the signal accumulated on the signal level accumulation capacitor 215 and that accumulated on the reset level accumulation capacitor 212 is amplified by the amplifier 217 and is output onto the output line 218.

According to the aforementioned image sensing element, since the difference between the signal level and noise level is amplified and output, fixed pattern noise of the image sensing element is eliminated, and noise due to variations of the reset switches of pixels can also be eliminated.

However, in such image sensing element, when a charge stored in the PD exceeds the parasitic capacitance of the PD, it undesirably leaks into a lower potential barrier portion. Such problems will be discussed with reference to FIGS. 7A and 7B. FIGS. 7A and 7B show the positional relationship among the PD, FD, and transfer switch in an upper portion, and also their potential state in a lower portion. Ideally, all charge components generated by the PD are accumulated on the parasitic capacitance of the PD, as shown in FIG. 7A. However, when charge components generated by the PD are large, they pass under the transfer switch having a low potential barrier, and leak into the FD, as shown in FIG. 7B. In the image sensing element having pixels with the aforementioned structure, when the difference between the signal level and reset level is calculated, as described above, the output signal is proportional to the charge generated by the PD in the ideal case shown in FIG. 7A. However, when the charge leaks from the PD into FD, as shown in FIG. 7B, the output signal decreases by charge components which are generated by the PD and leak into the FD.

Japanese Patent Laid-Open No. 2000-287131 describes a method of preventing the output signal from decreasing by replacing the output signal by a saturated signal after the charge leaks from PD into the FD. Also, Japanese Patent Laid-Open No. 2003-87665 describes a method of broadening the dynamic range by adding the signal corresponding to charge components which leak into the FD to the charge generated by the PD by utilizing this phenomenon.

However, with the method described in Japanese Patent Laid-Open No. 2000-287131, all pixel signals read out from pixels in each of which the charge leaks from the PD into FD are handled as identical pixel values. Therefore, the grayscale characteristics on the high luminance side are lost, and the dynamic range consequently narrows down. Also, with the method described in Japanese Patent Laid-Open No. 2003-87665, an image sensing element in which the charge generated by the PD leaks into only the FD can obtain an output proportional to the incident light amount. However, in an image sensing element in which the charge generated by the PD does not always leak into only the PD, a sensitivity difference is generated between the output based on the charge which leaks into the FD and the output when the PD is not saturated (no charge leaks from the PD). For this reason, their sum output has a knee point when the PD is saturated. When the saturated levels of the PDs and the charge leak amounts from the PDs into FDs have differences for respective pixels, the knee point varies among pixels.

SUMMARY OF THE INVENTION

The present invention has been made based on recognition of the above problems, and has as its object to broaden the dynamic range while suppressing the deterioration of image quality. More particularly, the present invention has as its object to eliminate or reduce the narrow-down problem of the dynamic range and/or the problem of knee point variations due to leakage of a charge from, e.g., a photoelectric converter into a charge-voltage converter.

An image sensing apparatus according to the present invention comprises at least one pixel, a signal read unit, and a saturation detector, the pixel comprises a photoelectric converter, a semiconductor region, and a transfer controller which transfers a charge generated in the photoelectric converter to the semiconductor region, the signal read unit is configured to output a signal from the semiconductor region, and the saturation detector comprises a reset controller which detects a signal generated in the semiconductor region during an exposure period of the photoelectric converter, and resets the photoelectric converter based on the detection result.

According to a preferred embodiment of the present invention, the reset controller is preferably configured to reset the photoelectric converter when a charge which leaks from the photoelectric converter into the semiconductor region is larger than a preset reference amount during the exposure period of the photoelectric converter, and not to reset the photoelectric converter otherwise.

According to a preferred embodiment of the present invention, the saturation detector preferably performs a comparison operation by a comparator which compares a signal generated in the semiconductor region and a reference potential at least twice during one exposure period.

According to a preferred embodiment of the present invention, preferably, the signal read unit is configured to read out, as a pixel signal, a difference between a signal read out from the semiconductor region in accordance with a transfer operation by the transfer controller, and a reset level signal read out from the semiconductor region before the transfer operation by the transfer controller, the reset controller is configured to perform a last comparison operation of the at least two comparison operations by the comparator after the reset level signal is read out, and the saturation detector is configured to reset the photoelectric converter in accordance with a result of a comparison operation other than the last comparison operation of the at least two comparison operations by the comparator.

According to a preferred embodiment of the present invention, the saturation detector preferably further comprises a memory which stores a comparison result of the comparator.

According to a preferred embodiment of the present invention, the saturation detector preferably further comprises memories which respectively store results of the at least two comparison operations by the comparator.

According to a preferred embodiment of the present invention, the apparatus preferably further comprises an output circuit which outputs a detection result of the saturation detector.

According to a preferred embodiment of the present invention, the output circuit is preferably configured to output the pixel signal read out by the signal read unit and the detection result of the saturation detector onto a single signal line in different periods.

According to a preferred embodiment of the present invention, the output circuit is preferably configured to output the detection result of the saturation detector in a period between a pixel signal of one pixel and a pixel signal of the next pixel, which are read out by the signal read unit.

According to a preferred embodiment of the present invention, the image sensing apparatus is preferably configured to set the reference potential.

According to a preferred embodiment of the present invention, the image sensing apparatus is preferably configured to set a reset timing of the photoelectric converter by the reset controller.

According to a preferred embodiment of the present invention, the transfer controller preferably comprises a transfer switch connected between the photoelectric converter and a charge-voltage converter, and a transfer switch controller which calculates a logical sum of a transfer pulse used to control the exposure period and a reset control signal provided from the reset controller, and controls the transfer switch based on the calculation result.

According to a preferred embodiment of the present invention, the transfer controller preferably comprises a first transfer switch and a second transfer switch which are connected in parallel between the photoelectric converter and a charge-voltage converter, the first transfer switch is controlled by a transfer pulse used to control the exposure period, and the second transfer switch is controlled by a reset control signal provided from the reset controller.

According to a preferred embodiment of the present invention, preferably, the pixel further comprises a reset unit which resets the semiconductor region, and the photoelectric converter is reset when the reset controller controls the transfer controller to electrically connect the photoelectric converter and the semiconductor region, and the reset unit resets the semiconductor region.

According to a preferred embodiment of the present invention, the apparatus preferably further comprises a signal processing circuit which processes a signal output from the signal read unit.

According to a preferred embodiment of the present invention, the signal processing circuit preferably corrects a pixel signal output from an image sensing element based on the detection result of the saturation detector.

According to a preferred embodiment of the present invention, the signal processing circuit preferably multiplies a pixel signal output from an image sensing element by a gain based on the detection result.

According to a preferred embodiment of the present invention, preferably, the image sensing apparatus further comprises a signal processing circuit which processes a signal output from the signal read unit, and the signal processing circuit multiplies a pixel signal output from the signal read unit by a gain to compensate a shortfall of the exposure period due to resetting of the photoelectric converter by the reset controller, when the detection result of the saturation detector indicates that a charge which leaks from the photoelectric converter into the semiconductor region during the exposure period of the photoelectric converter is larger than a preset reference amount.

According to a preferred embodiment of the present invention, preferably, the image sensing apparatus further comprises a signal processing circuit which processes a signal output from the signal read unit, and the signal processing circuit multiplies a pixel signal output from the signal read unit by a gain to compensate a shortfall of the exposure period due to resetting of the photoelectric converter by the reset controller, when a result of a comparison operation other than the last comparison operation of the at least two comparison operations by the comparator indicates that a charge which leaks from the photoelectric converter into the semiconductor region during the exposure period of the photoelectric converter is larger than a preset reference amount, and the signal processing circuit replaces a pixel signal output from an image sensing element by a saturated signal when a result of the last comparison operation indicates that a charge which leaks from the photoelectric converter into the semiconductor region during the exposure period of the photoelectric converter is larger than the preset reference amount.

According to the present invention, the dynamic range can be broadened while suppressing deterioration of image quality of an image sensed by the image sensing element. According to the present invention, the narrow-down problem of the dynamic range and/or the problem of knee point variations due to leakage of a charge from, e.g., a photoelectric converter into a charge-voltage converter can be eliminated or reduced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The first preferred embodiment of the present invention will be described hereinafter with reference to the accompanying drawings.

Figure 1:
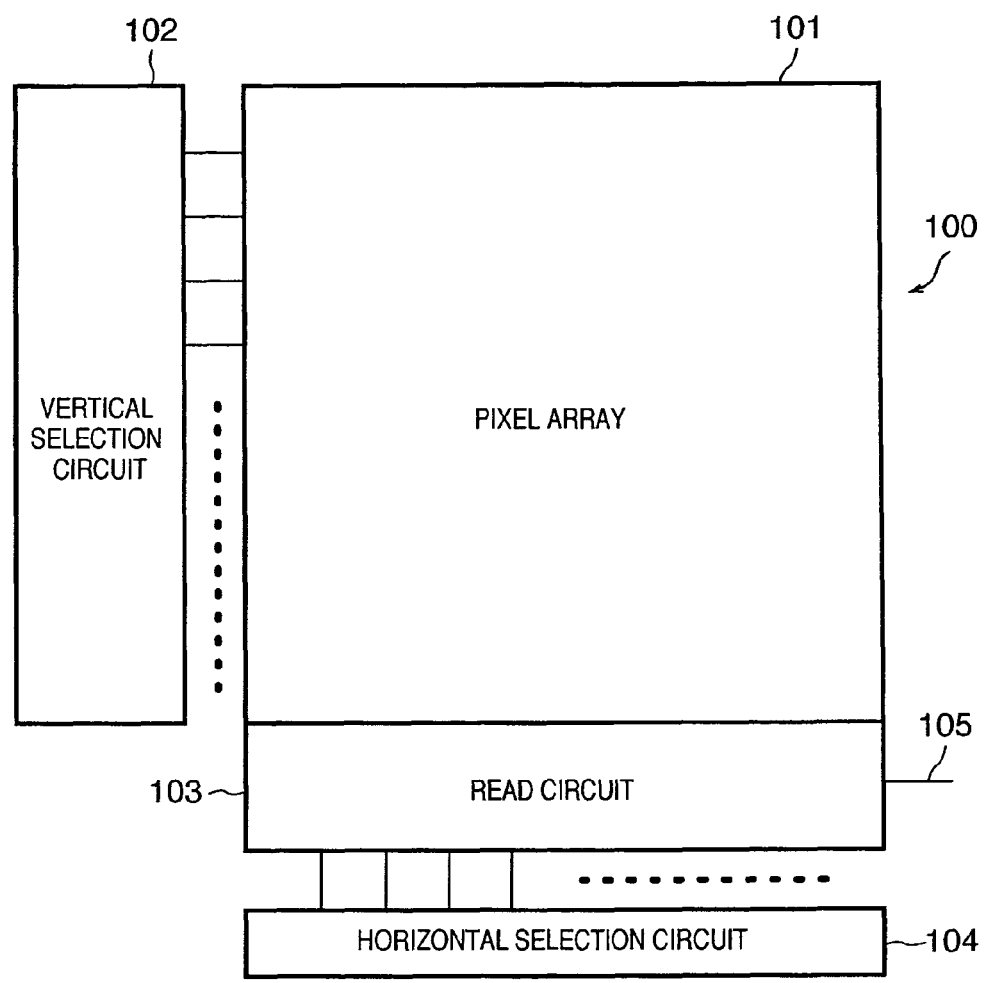
FIG. 1 is a schematic diagram showing the overall arrangement of an image sensing element according to a preferred embodiment of the present invention.
Figure 2:
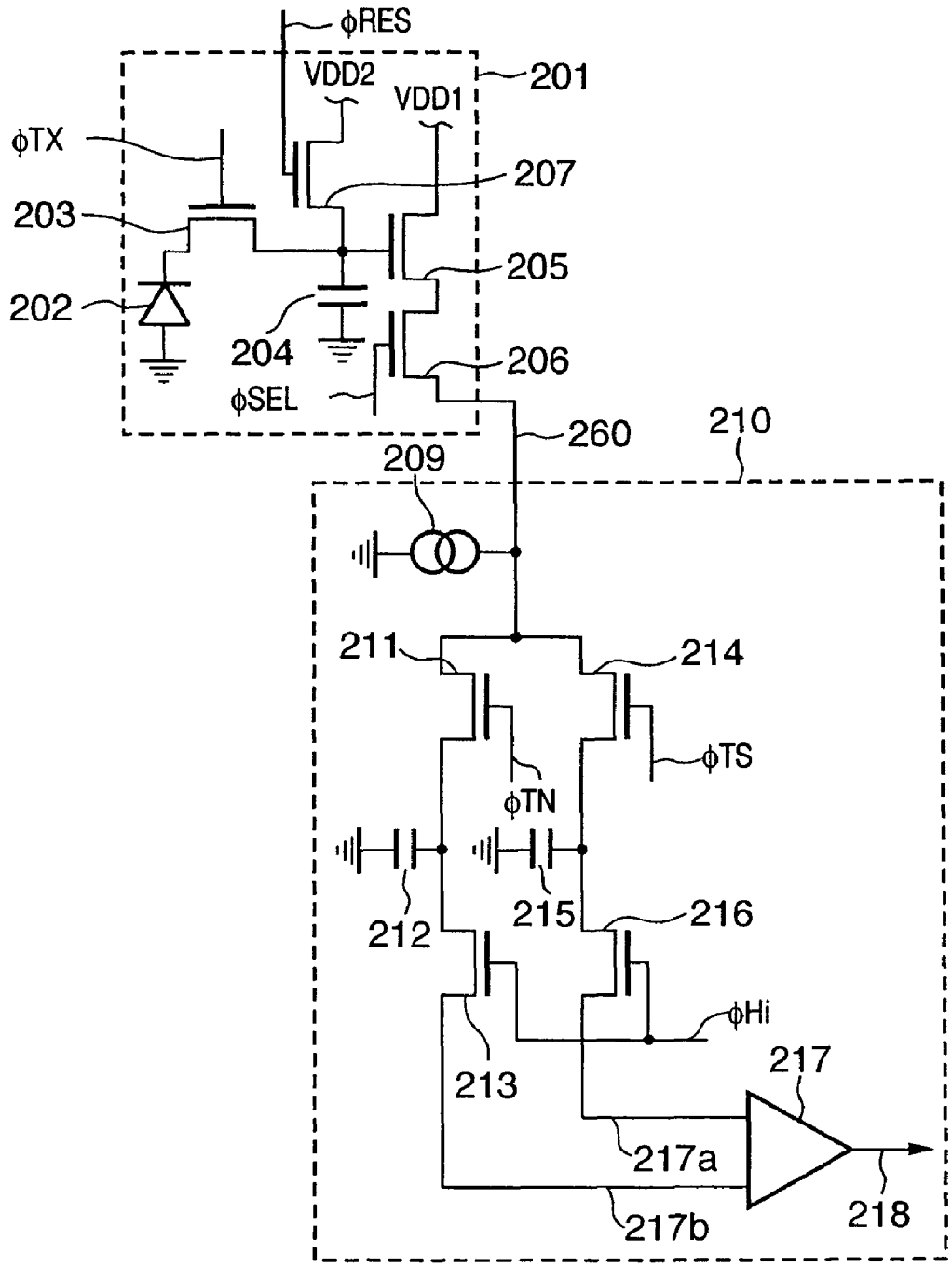
FIG. 2 is a circuit diagram showing the arrangement of one pixel in an image sensing element and that of a circuit for reading out a signal from that pixel so as to exemplify the problems of the present invention.
Figure 3:
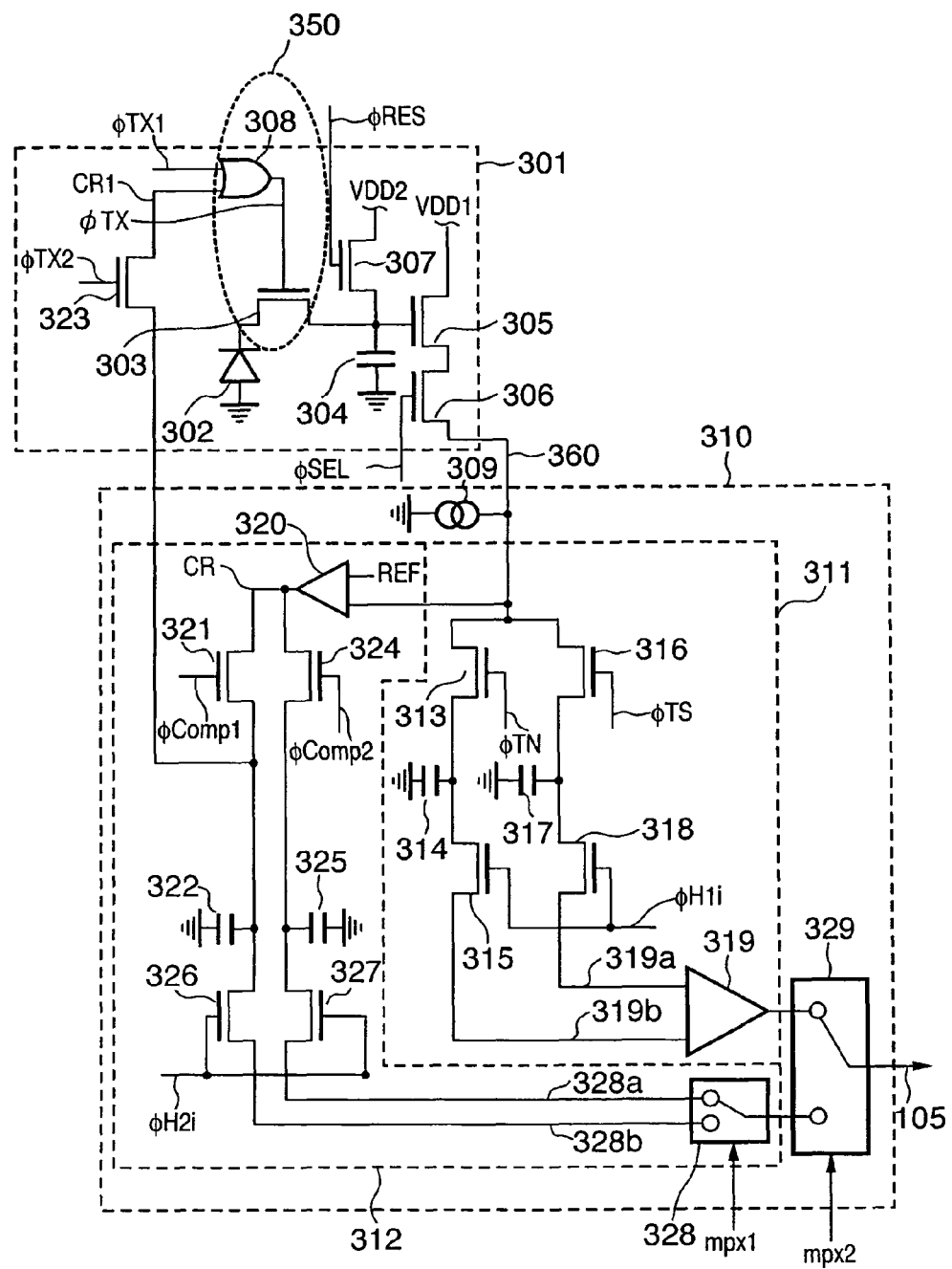
FIG. 3 is a circuit diagram showing the arrangement of one pixel and that of a circuit for reading out a signal from that pixel in the image sensing element shown in FIG. 1.
Figure 4:
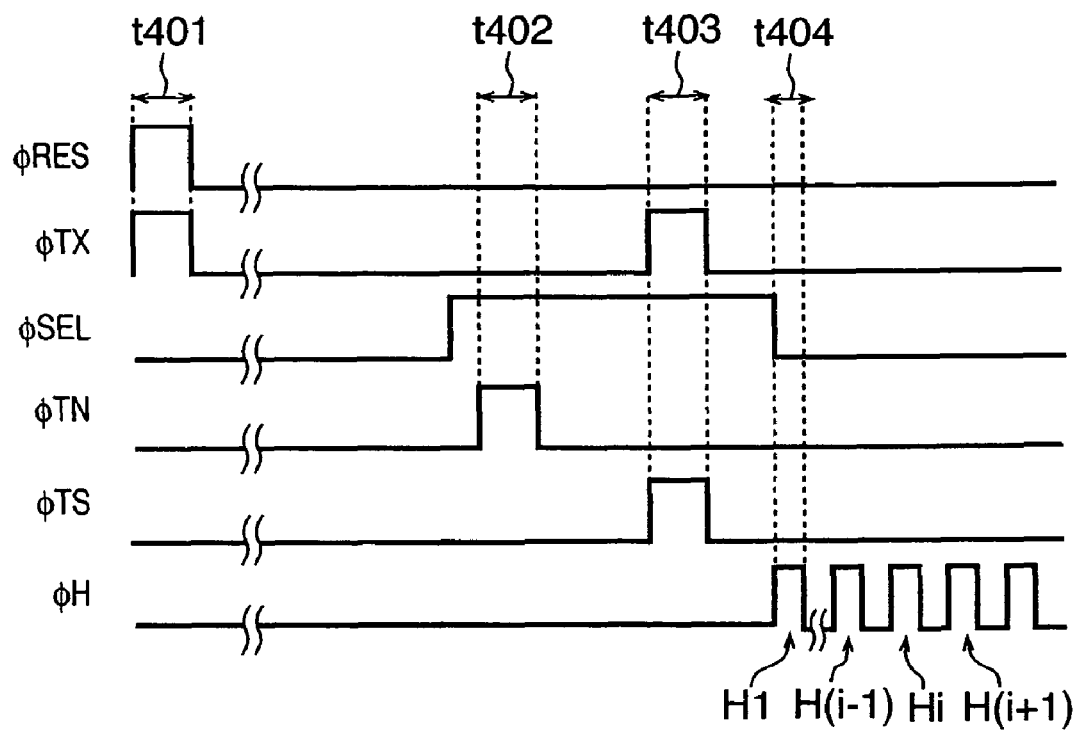
FIG. 4 is a chart showing the drive pattern of the image sensing element shown in FIG. 2.

FIG. 1 is a schematic diagram showing the overall arrangement of an image sensing element 100 according to the preferred embodiment of the present invention, and FIG. 3 is a circuit diagram showing the arrangement of one pixel and that of a circuit for reading out a signal from that pixel in the image sensing element 100 shown in FIG. 1. The image sensing element 100 can include a pixel array 101, a vertical selection circuit 102 which selects a row in the pixel array 101, a horizontal selection circuit 104 which selects a column in the pixel array 101, and a read circuit 103 which reads out a signal of a pixel selected by the vertical selection circuit 102 and horizontal selection circuit 104 of those in the pixel array 101. Note that the image sensing element 100 can comprise a timing generator or control circuit which provides timings to the vertical selection circuit 102, horizontal selection circuit 104, signal read circuit 103, and the like, and so forth in addition to the illustrated building components.

Typically, the vertical selection circuit 102 selects one of a plurality of rows in the pixel array 101 in turn, and the horizontal selection circuit 104 selects one of a plurality of columns in the pixel array in turn so as to select a plurality of pixels that form the row selected by the vertical selection circuit 102.

The pixel array 101 is formed by arranging a plurality of pixels in a two-dimensional array to provide a two-dimensional image. As shown in FIG. 3, each pixel 301 can include a photodiode (PD) 302, transfer switch 303, floating diffusion unit (FD; semiconductor region) 304, reset switch 307, amplifying MOS amplifier 305, selection switch 306, transfer switch controller 308, and comparison result transfer switch 323.

The PD 302 serves as a photoelectric converter that photoelectrically converts light coming via an optical system. The anode of the PD 302 is connected to a ground line, and its cathode is connected to the source of the transfer switch 303. The transfer switch 303 is driven in response to a transfer pulse $\phi$TX input to its gate terminal, and transfers a charge generated by the PD 302 to the FD 304. The FD (semiconductor region) 304 serves as a charge-voltage converter which temporarily accumulates the charge, and converts the accumulated charge into a voltage signal.

The transfer switch controller 308 generates the transfer pulse $\phi$TX by ORing a vertical transfer pulse $\phi$TX1 used to control an exposure period, and a first comparison result signal (reset control signal) CR1 (to be described later). The transfer switch 303 and transfer switch controller 308 form a transfer controller 350 which transfers the charge generated by the PD 302 to the FD 304 when at least one of the vertical transfer pulse $\phi$TX1 and first comparison result signal CR1 goes to active level (high level in this case).

Figure 8:
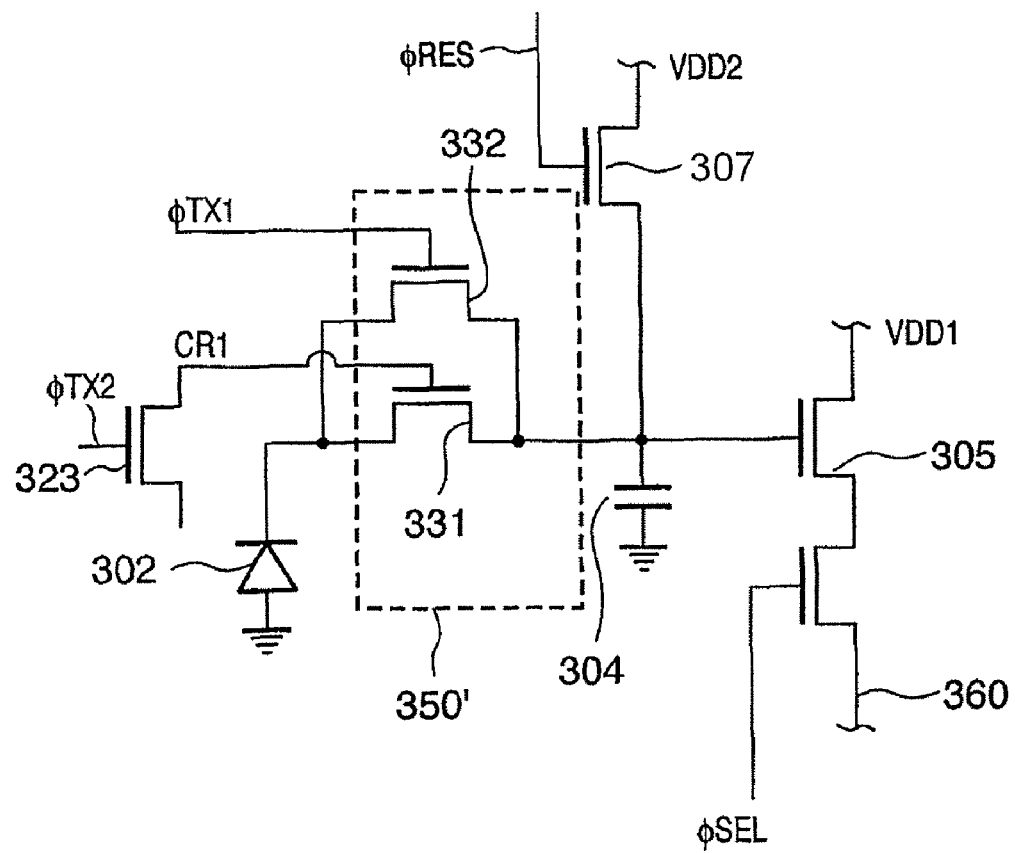
FIG. 8 is a circuit diagram showing another example of the arrangement of a transfer-controller.

FIG. 8 is a circuit diagram showing another example of the arrangement of the transfer controller. A transfer controller 350' shown in FIG. 8 comprises transfer switches 331 and 332 which are connected in parallel between the cathode of the PD 302 and the FD 304. The first comparison result signal CR1 is connected to the gate of the transfer switch 331, and the vertical transfer pulse $\phi$TX1 used to control the exposure period is connected to the gate of the transfer switch 332. Therefore, the transfer controller 350' shown in FIG. 8 forms the transfer controller 350 which transfers the charge generated by the PD 302 to the FD 304 when at least one of the vertical transfer pulse $\phi$TX1 and first comparison result signal CR1 goes to active level (high level in this case).

The amplifying MOS amplifier 305 serves as a source follower, and its gate receives the signal that has undergone the charge-voltage conversion by the FD 304. The drain of the amplifying MOS amplifier 305 is connected to a first power supply line VDD1 that provides a first potential, and its source is connected to the selection switch 306. The selection switch 306 is driven by a vertical selection pulse $\phi$SEL which is provided from the vertical selection circuit 102 to its gate, its drain is connected to the amplifying MOS amplifier 305, and its source is connected to a vertical signal line 360. When the vertical selection pulse $\phi$SEL goes to active level (high level in this case), the selection switch 306 of a pixel which belongs to the row of interest of the pixel array 101 is enabled, and the source of the amplifying MOS amplifier 305 is connected to the vertical signal line 360.

The switch 323 is used to transfer a comparison result stored in a first comparison result memory 322 to the transfer controller 350 (the transfer controller 350' in the example shown in FIG. 8) as the first comparison result signal CR1, and is driven by a comparison result transfer pulse $\phi$TX2 provided from the vertical selection circuit 102.

The drain of the reset switch 307 is connected to a second power supply line VDD2 which provides a second potential (reset potential), and its source is connected to the FD 304.

The reset switch 307 is driven by a reset pulse $\phi$RES input to its gate, and resets the charge accumulated on the FD 304.

A floating diffusion amplifier is formed by a constant current source 309 which supplies a constant current to the vertical signal line 360 in addition to the FD 304 and amplifying MOS amplifier 305. In each pixel that forms the row selected by the selection switch 306, a charge to be transferred to the FD 304 is converted into a voltage signal by the FD 304, and is output to a corresponding signal read unit 310 via the floating diffusion amplifier.

The read unit 310 can include a signal read unit 311, saturation detector 312, and signal selection circuit 329.

The signal read unit 311 will be described first. A switch 313 is used to read out the reset potential of the FD 304 as a reset level signal, and is driven by a reset level read pulse $\phi$TN. A reset level accumulation capacitor 314 accumulates a reset level signal (a signal of a potential corresponding to the reset level of the FD 304) immediately before a pixel signal is read out.

A switch 316 is used to read out a voltage signal corresponding to the charge signal generated by the PD 302, and is driven by a signal read pulse $\phi$TS. A signal level accumulation capacitor 317 accumulates a pixel signal (a signal of a potential according to a charge transferred from the PD 302 to the FD 304) when the pixel signal is read out.

A differential amplifier 319 outputs, onto an output line 105, a difference between the level of the signal accumulated on the reset level accumulation capacitor 314 and that of the signal accumulated on the signal level accumulation capacitor 317. Switches 315 and 318 are driven by a horizontal signal selection pulse $\phi$H1$i$ provided from the horizontal selection circuit 104, and respectively transfer the potentials in the capacitors 314 and 317 to the differential amplifier 319. On the output line 105, a value obtained by amplifying the difference between the potential corresponding to the charge transferred from the PD 302 to the FD 304 and that of the FD 304 in a reset state is output as a pixel signal.

To common output lines 319$a$ and 319$b$ connected to the input terminals of the differential amplifier 319, switches 315 and 318 in other columns, which are driven by horizontal signal selection pulses $\phi$H11 to $\phi$H1(i−1) and $\phi$H1(i+1) to $\phi$H1$n$ are also connected (n is the number of columns of the pixel array 101). The horizontal signal selection pulses $\phi$H1$i$ (i=1 to n) are applied in, e.g., the order of 1 to n by the horizontal selection circuit 104.

The saturation detector 312 will be described below. A comparison circuit or comparator 320 compares a preset reference potential REF with the potential of the FD 304 during a charge accumulation period (exposure period), which is read out onto the vertical signal line 360 via the amplifying MOS amplifier 305 and selection switch 306, and outputs the comparison result as a comparison result signal CR.

Note that the comparison result signal CR has a first or second logical level depending on the comparison result. More specifically, when the potential of the FD 304 which is read out onto the vertical signal line 360 via the amplifying MOS amplifier 305 and selection switch 306 is lower than the reference potential REF, i.e., when the charge leaks from the PD 302 into the FD 304 exceeding a reference amount, the comparison circuit 320 outputs a first logical level VDDCOMP (high level in this case). When the potential of the FD 304 which is read out onto the vertical signal line 360 via the amplifying MOS amplifier 305 and selection switch 306 is higher than the reference potential REF, i.e., when no charge leaks from the PD 302 into the FD 304 or when the leak amount is less than the reference amount, the comparison circuit 320 outputs a second logical level GNDCOMP (low level in this case).

The image sensing element 100 is preferably configured to arbitrarily set the reference potential REF. For example, when the image sensing element 100 is configured to apply the reference potential REF from outside the image sensing element 100, the reference potential REF can be set at an arbitrary potential. Alternatively, the image sensing element 100 may comprise a converter, which may generate the reference potential REF in accordance with data or a code provided from outside the image sensing element 100.

Switches 321 and 324 are respectively used to transfer the comparison result (VDDCOMP or GNDCOMP) by the comparison circuit 320 to the first comparison result memory 322 and a second comparison result memory 325. The switches 321 and 324 are respectively driven by a first storage pulse φComp1 and second storage pulse φComp2.

The image sensing element 100 is preferably configured to arbitrarily set the timing of the comparison result transfer pulse φTX2. Switches 326 and 327 are used to transfer the comparison result stored in the second comparison result memory 325 to a saturation detection signal selection circuit 328, and are driven by a horizontal comparison signal selection pulse 100 H2$i$. The saturation detection signal selection circuit 328 selects the first comparison result memory 322 when a saturation detection signal selection signal φmpx1 is at first logical level (high level in this case), and selects the second comparison result memory 325 when it is at second logical level (low level in this case).

To common output lines 328$a$ and 328$b$ respectively connected to the input terminals of the saturation detection signal selection circuit 328, switches 326 and 327 in other columns, which are driven by horizontal comparison signal selection pulses φH21 to φH2(i−1) and φH2(i+1) to φH2$n$ are also connected (n is the number of columns of the pixel array 101). The horizontal comparison signal selection pulses φH2$i$ (i=1 to n) are applied in, e.g., the order of 1 to n by the horizontal selection circuit 104.

The signal selection circuit 329 will be described below. The signal selection circuit 329 selects one of the output signal (pixel signal) of the signal read unit 311 and that (comparison result) of the saturation detector 312 in accordance with a selection signal mpx2, and outputs the selected signal onto the output line 105. More specifically, when the selection signal mpx2 is at first logical level (high level in this case), the signal selection circuit 329 selects the output signal (pixel signal) of the signal read unit 311; when it is at second logical level (low level in this case), the circuit 329 selects the output signal (comparison result) of the saturation detector 312.

Figure 5:
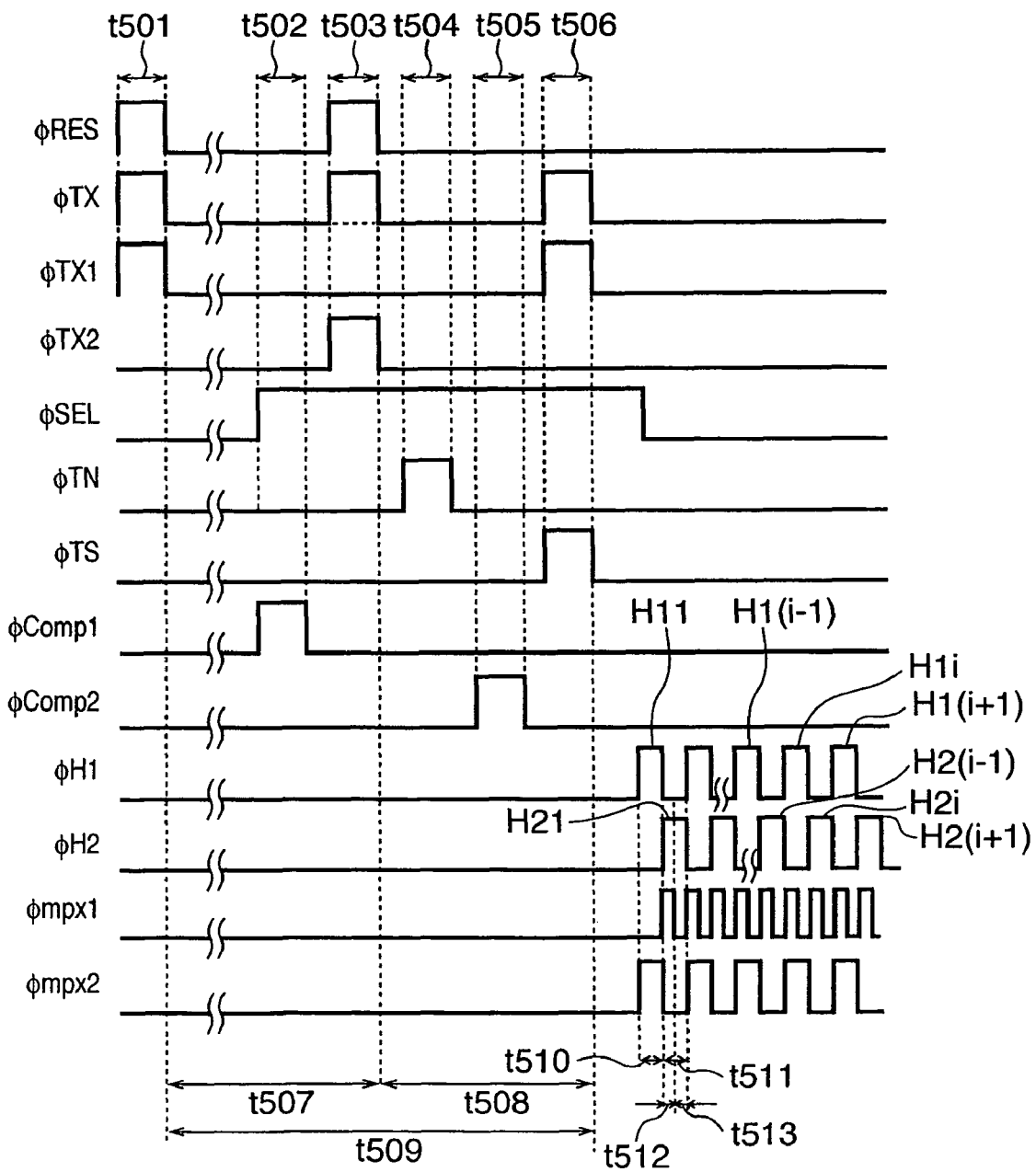
FIG. 5 is a chart showing the drive pattern of the image sensing element shown in FIGS. 1 and 3.

FIG. 5 is a chart showing the drive pattern of the image sensing element 100 shown in FIGS. 1 and 3. The operation of the image sensing element 100 will be described below with reference to FIGS. 1, 3, and 5.

When the pulses φRES and φTX1 are applied from a timing generator (or a control circuit; the same applies to the following description) during a period t501, the pulse φTX is generated, the reset switch 307 is turned on by the pulse φRES, and the transfer switch 303 is turned on by the pulse φTX1. In this way, the potentials of the PD 302 and FD 304 are reset to initial potentials, and upon completion of the reset operation, a new exposure period (accumulation period) t509 starts. Note that the exposure period t509 starts from the reset end timing and ends at the end timing of the vertical transfer pulse φTX1.

After that, the timing generator applies the pulse φSEL for the row to be read out of the pixel array 101 to turn on the selection switch 306, thus selecting the row to be read out.

Figure 7A:
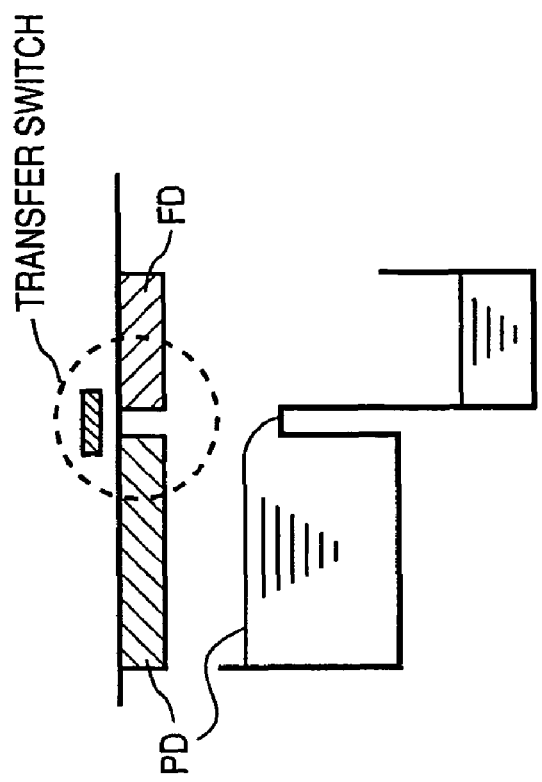
FIGS. 7A and 7B are views showing the potentials of a photodiode and floating diffusion.
Figure 7B:
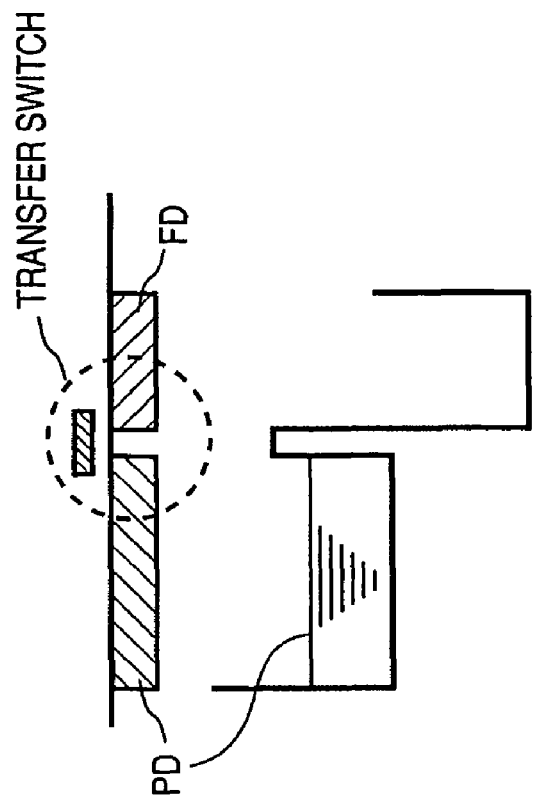

During a period t502 in the exposure period, the timing generator applies the pulse φComp1 to turn on the switch 321. As a result, the comparator 320 compares the reference potential REF with the potential, which is obtained by amplifying the potential corresponding to the charge accumulated on the FD 304 by the amplifying MOS amplifier 305 and is output onto the vertical signal line 360, and outputs the comparison result as the comparison result signal CR, which is written in the first comparison result memory 322. As shown in FIG. 7B, if a charge leaks from the PD 302 to the FD 304, the first logical level VDDCOMP (high level in this case) is written in the first comparison result memory 322. On the other hand, if no charge leaks from the PD 302 to the FD 304, the second logical level GNDCOMP (low level in this case) is written in the first comparison result memory 322.

During a period t503 in the exposure period, the timing generator applies the reset pulse φRES and comparison result transfer pulse φTX2. When the first logical level VDDCOMP is written in the first comparison result memory 322, the transfer pulse φTX is generated, and the PD 302 and FD 304 are reset. On the other hand, when the second logical level GNDCOMP is written in the first comparison result memory 322, since no transfer pulse φTX is generated, the FD 304 alone is reset by the reset pulse φRES.

During a period t504 in the exposure period, since the timing generator applies the pulse φTN to turn on the switch 313, a value corresponding to the reset potential of the FD 304 is written in the reset level accumulation capacitor 314.

During a period t505 in the exposure period, the timing generator applies the pulse φComp2 to turn on the switch 324. In response to this pulse, the potential which corresponds to the charge that leaks from the PD 302 to the FD 304 (reset level if no charge leaks) is amplified by the amplifying MOS amplifier 305 and is output onto the vertical signal line 360. The comparator 320 compares the potential on the vertical signal line 360 with the reference potential REF, and outputs the comparison result as the comparison result signal CR, which is written in the second comparison result memory 325.

During a period t506, the timing generator applies the vertical transfer pulse φTX1 and signal read pulse φTS. The end timing of the vertical transfer pulse φTX1 means that of the exposure period. Upon application of the vertical transfer pulse φTX1, the transfer pulse φTX is generated to turn on the switch 303, and the charge accumulated on the PD 302 is transferred to the FD 304. Upon application of the signal read pulse φTS, the switch 316 is turned on, and the potential corresponding to the charge transferred to the FD 304 is stored in the signal level accumulation capacitor 317.

After that, for respective columns (first to n-th columns) of the pixel array 101, (a) a difference between the signal accumulated on the signal level accumulation capacitor 317 and that stored in the reset level accumulation capacitor 314 (i.e., a pixel signal), (b) the signal stored in the first comparison result memory 322, and (c) the signal stored in the second comparison result memory 325 are output. Note that the signals (b) and (c) are output in the interval between neighboring pixel signals (a) (in the interval between the outputs of the pixel signals of the i-th and (i+1)-th columns), i.e., during a period in which the common output lines 319$a$ and 319$b$ are reset by reset means (not shown).

The output sequences of the signals (a), (b), and (c) will be described below taking the first column of the pixel array 101 as a representative example. During a period t510, when the timing generator applies the horizontal signal selection pulse φH11 (φH1i; i=1), and sets the selection signal mpx2 at first logical level (high level in this case) (horizontal comparison signal selection pulses φH2i (H2i: i=all of 1 to n) are inactive), the switches 315 and 318 are turned on, and the difference between the signals in the signal level accumulation capacitor 317 and reset level accumulation capacitor 314 is amplified by the amplifier 319, and is output onto the output line 105.

During a period t511, when the timing generator applies the horizontal comparison signal selection pulse φH21 (H2i; i=1) and sets the selection signal mpx2 at second logical level (low level in this case) (horizontal signal selection pulses φH1i (H1i; i=all of 1 to n) are inactive), the selection circuit 329 outputs the output of the saturation detector 312 onto the output line 105. Note that the period t511 includes a period t512 during which the saturation detection signal selection signal φmpx1 changes to first logical level (high level in this case) and a period t513 during which it changes to second logical level (low level in this case). The signal stored in the first comparison result memory 322 is output onto the output line 105 during the period t512, and the signal stored in the second comparison memory 325 is output onto the output line 105 during the period t513.

Figure 6:
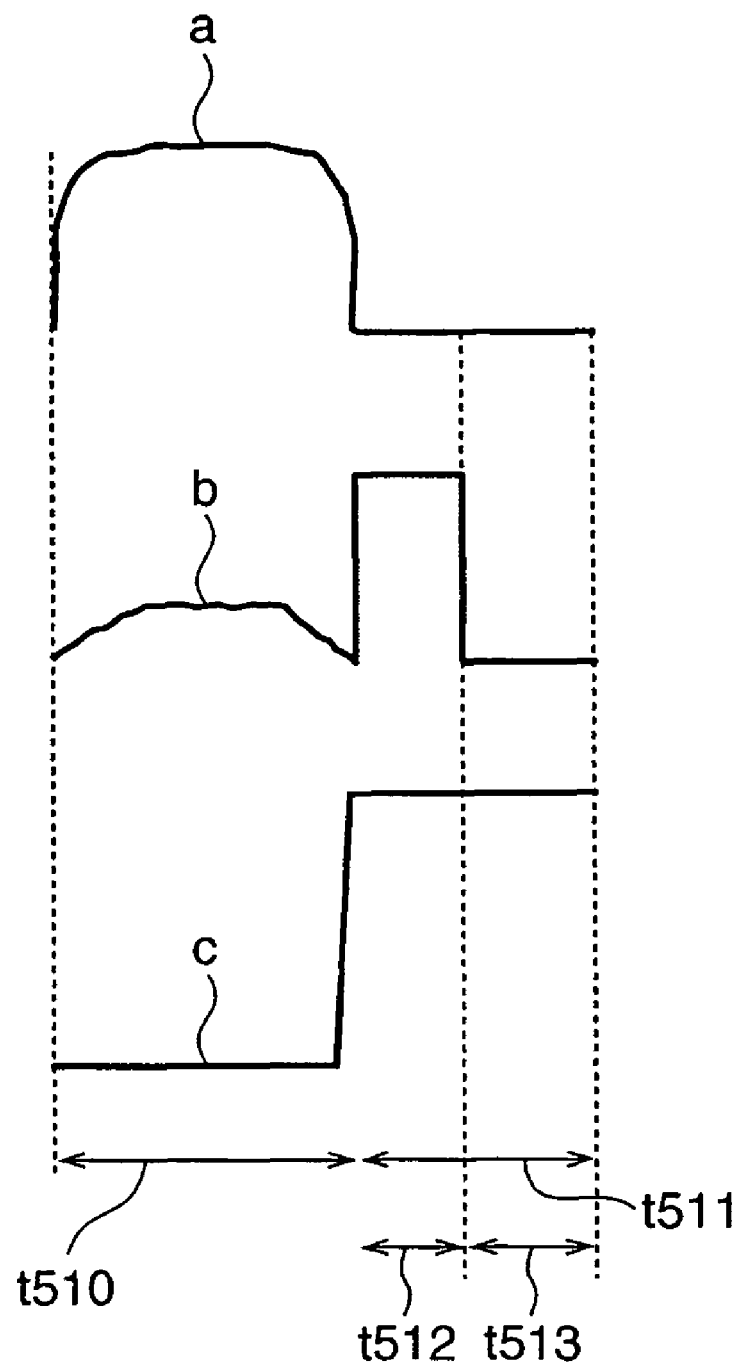
FIG. 6 is a chart showing examples of three types of signals to be output onto an output line.

FIG. 6 exemplifies the three types of signals output onto the output line 105. In FIG. 6, "a" indicates an example of a case wherein the second logical level GNDCOMP is written in both the first and second comparison result memories 322 and 325, and charge leakage from the PD 302 to the FD 304 has never occurred. In FIG. 6, "b" indicates a case wherein the first logical level VDDCOMP is written in the first comparison result memory 322, and the second logical level GND-COMP is written in the second comparison result memory 325. In this case, charge leakage from the PD 302 to the FD 304 has occurred during a period tS07, and the charge accumulated on the PD 302 and that leaks into the FD 304 during the period t507 are reset accordingly. For this reason, the effective exposure period or accumulation time period in the PD 302 (accumulation time period reflected in a pixel signal output from the output line 105) corresponds to a period t508. In FIG. 6, "c" indicates a case wherein the first logical level VDDCOMP is stored in the first and second comparison result memories 322 and 325, i.e., a case wherein charge leakage from the PD 302 to the FD 304 has occurred during both the periods t507 and t508.

When a charge leaks from the PD 302 to the FD 304 beyond the reference amount in each of some pixels of the pixel array 101, the signal from the output line 105 is not valid as an image signal if it is output intact. This is because the effective exposure period or accumulation time period in the PD 302 varies for respective pixels so as to reflect such charge leak in the value stored in the first comparison result memory 322. For this reason, a signal processing circuit (e.g., a signal processing circuit 8 (FIG. 9) to be described later) which is connected after the image sensing element 100 must correct each pixel value of the image signal to an appropriate value.

This correction method will be described below. In case "a" shown in FIG. 6, the image signal (that output from the image sensing element 100) output onto the output line 105 is used intact as an image signal. In case "b" in FIG. 6, the image signal is multiplied by a gain. The gain may be determined to compensate a shortfall of the effective exposure period or accumulation time period (t508) with respect to the exposure period (t509) of the PD 302. That is, the image signal output onto the output line 105 may be multiplied as the gain by (accumulation time period t509)/(accumulation time period t508). In case "c" shown in FIG. 6, a saturated signal is output as the image signal. The signal indicated by "c" in FIG. 6 has poor reliability since it is obtained by subtracting the signal corresponding to charge components which leaks into the FD 304 from the signal corresponding to charge components accumulated on the PD 302.

As described above, according to the preferred embodiment of the present invention, the effective accumulation time period of each pixel in the image sensing apparatus can be changed in correspondence with charge leakage from the PD to the FD, thus broadening the dynamic range.

In the above embodiment, the PD is reset only once during the exposure period. When a plurality of memories corresponding to the first comparison result memory are provided, the PD can be reset a plurality of number of times during the exposure period. In this case, the dynamic range can be further broadened.

In the above embodiment, the values in the first and second comparison result memories are directly output. Alternatively, by inverting the value of one of the first and second comparison result memories and outputting the inverted value, signal variations on the output line can be reduced.

In the above embodiment, the saturation detection output of each pixel is output using the reset period of the signal output. With this arrangement, information such as the saturation detection signal attached to the image signal can be output without any new output pin. Also, when the number of output pins can be increased, the saturation detection signal can be output from another new pin.

Figure 9:
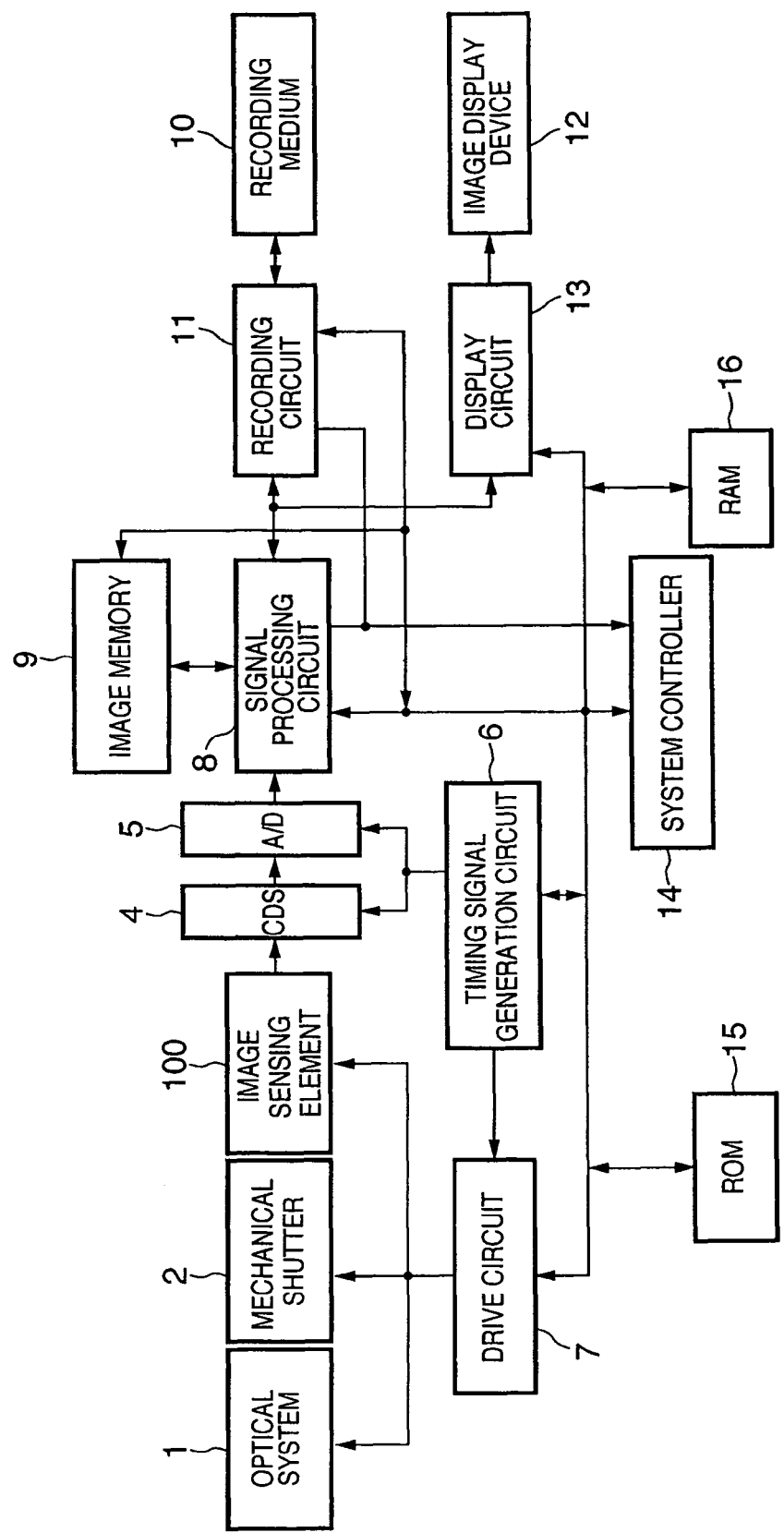
FIG. 9 is a block diagram showing an embodiment of an image sensing apparatus or processing apparatus according to a preferred embodiment of the present invention.

An image sensing apparatus which incorporates the image sensing element 100 as its application example will be described below. FIG. 9 is a block diagram showing a preferred embodiment of an image sensing apparatus according to the present invention.

The image sensing element 100 of the above embodiment receives light rays via an optical system 1 having an aperture mechanism and lens. A mechanical shutter 2 may be inserted between the optical system 1 and image sensing element 100 or in the optical system 1. The optical system 1, mechanical shutter 2, and image sensing element 100 are driven by a drive circuit 7. A CDS (Correlated Double Sampling) circuit 4 applies CDS processing to the output signal from the image sensing element 100, and an A/D converter 5 converts an analog signal processed by the CDS circuit 4 into a digital signal. A timing signal generation circuit 6 generates timing signals to be provided to the CDS circuit 4 and A/D converter 5. A signal processing circuit 8 applies various kinds of signal processing as well as the aforementioned signal processing to the A/D-converted image data. An image memory 9 stores the image data that has undergone the signal processing.

A recording circuit 11 records the image data that has undergone the signal processing in a recording medium 10. A display circuit 13 provides the image data that has undergone the signal processing to an image display device 12 and controls it to display an image.

A ROM 15 such as a nonvolatile memory or the like stores control programs, control data such as parameters, tables, and the like used upon execution of the programs, and correction data for damaged addresses, and the like. To a RAM 16, the programs, control data, and correction data stored in the ROM 15 are transferred, and are used by a system controller 14 which controls the entire image sensing apparatus.

Prior to an image sensing operation, at the beginning of the operation of the system controller 14 (e.g., at the power-ON timing of the image sensing apparatus), the required programs, control data, and correction data are transferred from the ROM 15 to the RAM 16. The optical system 1 drives an aperture and lens in accordance with a control signal sent from the system controller 14, and forms an object image set with an appropriate brightness value on the image sensing element 100. The mechanical shutter 2 shields the image sensing element 100 in synchronism with its operation in accordance with a control signal sent from the system controller 14. The image sensing element 100 is driven by drive pulses, which are generated by the drive circuit 7 based on operation pulses generated by the timing signal generation circuit 6 controlled by the system controller 14. The image sensing element 100 converts the object image into an electrical signal by photoelectric conversion, and outputs it as an analog image signal. The CDS circuit 4 removes clock synchronous noise from the analog image signal, and the A/D converter 5 converts that image signal into a digital image signal based on the operation pulses generated by the timing signal generation circuit 6 controlled by the system controller 14. The signal processing circuit 8 controlled by the system controller 14 applies image processing including color conversion, white balance, gamma correction, and the like, resolution conversion processing, image compression processing, and the like to the digital image signal. The image memory 9 is used to temporarily store the digital image signal whose signal processing is underway, and to store image data as the digital image signal that has undergone the signal processing. The image data that has undergone the signal processing by the signal processing circuit 8 or image data stored in the image memory 9 is converted into data (e.g., file system data having a hierarchical structure) suited to the image recording medium 10 and is recorded on the recording medium 10 by the recording circuit 11, or is converted into a signal (e.g., an NTSC analog signal or the like) suited to the image display device 11 and is displayed on the image display device 11 by the display circuit 13 after it undergoes the resolution conversion processing by the signal processing circuit 8.

Note that the signal processing circuit 8 may directly output the digital image signal to the image memory 9 or the recording circuit 11 without any signal processing. Upon reception of a request from the system controller 14, the signal processing circuit 8 outputs information (e.g., information such as the spatial frequency of an image, the average value of the designated region, the data size of a compressed image, and the like) of a digital image signal or image data generated during the signal processing, or information extracted from them to the system controller 14. Furthermore, upon reception of a request from the system controller 14, the recording circuit 11 outputs information such as the type, free space, and the like of the image recording medium 10 to the system controller 14.

Figure 10:
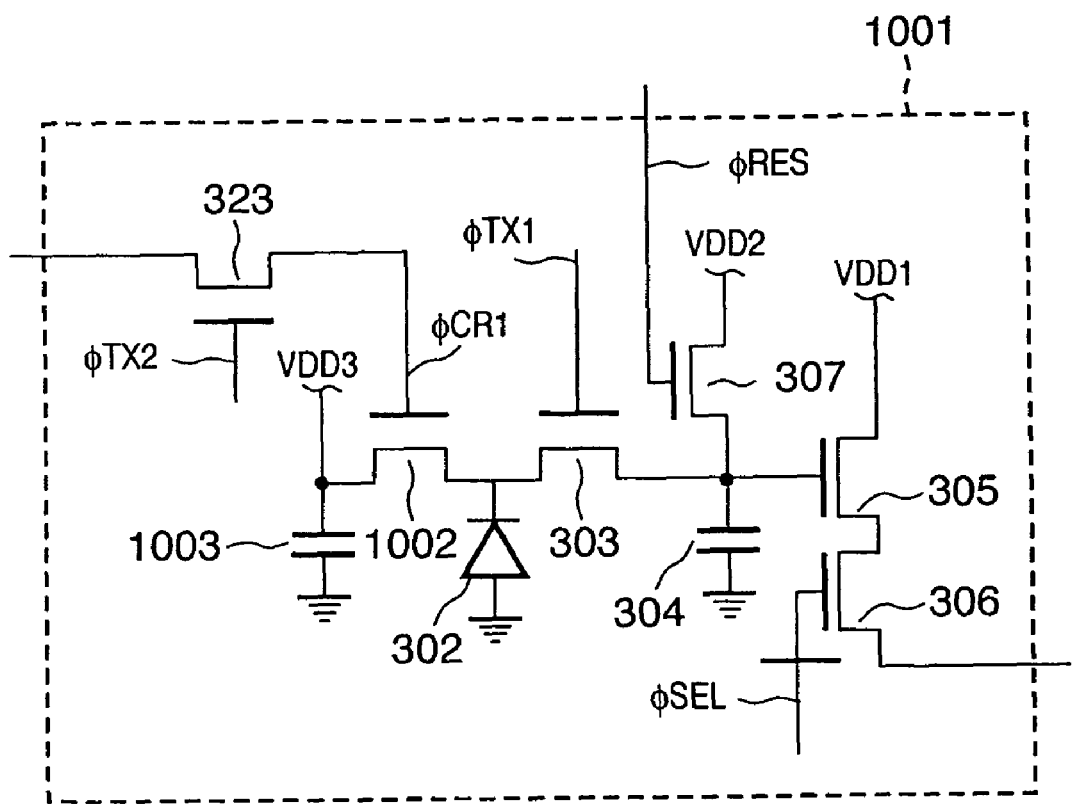
FIG. 10 is a circuit diagram showing the arrangement of one pixel and that of a circuit for reading out a signal from that pixel in the image sensing element shown in FIG. 1.

The second preferred embodiment of the present invention will be described below with reference to the accompanying drawings. In the second embodiment, the arrangement of the pixel 301 shown in FIG. 3 is replaced by that shown in FIG. 10. As shown in FIG. 10, each pixel 1001 can include a photodiode (PD) 302, transfer switch 303, floating diffusion unit (FD) 304, reset switch 307, amplifying MOS amplifier 305, selection switch 306, comparison result transfer switch 323, overflow drain region (to be referred to as OFD hereinafter) 1003, and PD reset switch 1002.

The transfer switch 303 is connected between the cathode of the PD 302 and the FD 304, and a vertical transfer pulse φTX1 that controls the exposure period is connected to its gate. The PD reset switch 1002 is connected between the cathode of the PD 302 and the OFD 1003, and a first comparison result signal CR1 is connected to its gate. The OFD 1003 is connected to a third power supply line VDD3. Therefore, when the vertical transfer pulse φTX1 is activated (high level in this case), the charge generated by the PD 302 is transferred to the FD 304; when the comparison result signal CR1 is activated (high level in this case), the charge generated by the PD 302 is drained to the OFD 1003.

Figure 11:
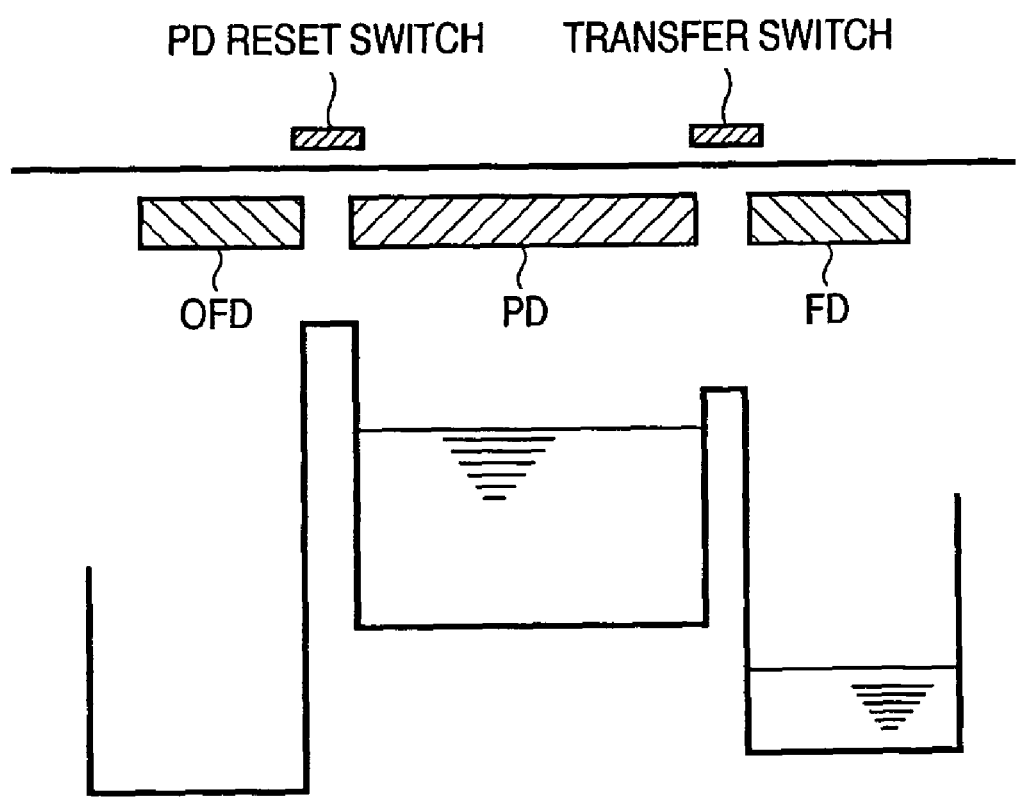
FIG. 11 is a view showing the potentials of a photodiode, floating diffusion, and overflow drain region.

FIG. 11 illustrates the positional relationship among the PD, FD, OFD, PD reset switch, and transfer switch in an upper portion, and also their potential states in a lower portion. Potential design is made to control a charge generated by the PD not to leak into the OFD side but to leak into the FD side when both the vertical transfer pulse φTX1 and the signal CR1 are at low level.

The example of the arrangement other than the pixel arrangement is the same as that in the first embodiment. The drive sequence is also the same as that in the first embodiment. However, φTX2 and φRES need not always have an identical time band.

As many apparently widely different embodiments of the present invention can be made without departing from the spirit and scope thereof, it is to be understood that the invention is not limited to the specific embodiments thereof except as defined in the claims.

What is claimed is:

1. An image sensing apparatus comprising:
   at least one pixel comprising a photoelectric converter, a floating diffusion part which briefly accumulates a charge generated in the photoelectric converter, a transfer switch which transfers the charge from the photoelectric converter to the floating diffusion part and a reset unit which resets the floating diffusion part;
   a signal read unit which reads out a signal from the floating diffusion part;
   a detector which detects an amount of a charge which leaks from the photoelectric converter into the floating diffusion part by comparing a preset reference potential with the potential of the floating diffusion part during an exposure period of the photoelectric converter in a state that the transfer switch is turned off; and
   a controller which turns on the transfer switch and the reset unit so as to reset the photoelectric converter when the potential of the floating diffusion part during the exposure period of the photoelectric converter is lower than the preset reference potential, and which turns on the reset unit without turning on the transfer switch so as to reset the floating diffusion part without resetting the photoelectric converter otherwise.

2. The apparatus according to claim 1, further comprising a signal processing circuit corrects a signal read out by the signal read unit based on the detection result of the detector.

3. The apparatus according to claim 2, wherein the signal processing circuit multiplies the signal by a gain based on the detection result.

4. The apparatus according to claim 3, wherein the signal processing circuit multiplies the signal by a gain to compensate a shortfall of the exposure period due to resetting of the photoelectric converter by the controller.

* * * * *